United States Patent
Kamel et al.

(10) Patent No.: US 6,662,019 B2
(45) Date of Patent: Dec. 9, 2003

(54) POWER CONTROL AND TRANSMISSION RATE PARAMETERS OF A SECONDARY CHANNEL IN A WIRELESS COMMUNICATION SYSTEM

(75) Inventors: Raafat E Kamel, Little Falls, NJ (US); Alexandro Salvarani, Edison, NJ (US); Mathew Thomas, Scotch Plains, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 338 days.

(21) Appl. No.: 09/742,613

(22) Filed: Dec. 21, 2000

(65) Prior Publication Data

US 2002/0123362 A1 Sep. 5, 2002

(51) Int. Cl.$^7$ .............................. H04B 7/00; H04Q 7/20
(52) U.S. Cl. ....................... 455/522; 455/69; 370/335; 370/342
(58) Field of Search ................... 455/522, 69; 370/335, 370/342

(56) References Cited

U.S. PATENT DOCUMENTS

| | | | | |
|---|---|---|---|---|
| 5,987,326 A | | 11/1999 | Tiedemann et al. | 455/442 |
| 6,067,458 A | * | 5/2000 | Chen | 455/522 |
| 6,088,578 A | * | 7/2000 | Manning et al. | 455/68 |
| 6,148,208 A | | 11/2000 | Love | 455/442 |
| 6,167,270 A | * | 12/2000 | Rezaiifar et al. | 455/442 |
| 6,272,124 B1 | * | 8/2001 | Ahn et al. | 370/342 |
| 6,396,804 B2 | * | 5/2002 | Odenwalder | 370/209 |

FOREIGN PATENT DOCUMENTS

| | | | |
|---|---|---|---|
| EP | 1 063805 A | 12/2000 | H04L/1/00 |
| WO | WO 01 67641 A | 9/2001 | H04B/7/26 |

OTHER PUBLICATIONS

European Search Report dated May 16, 2002 of Kamel 19–8% Application No. 01306894.5–2411, The Hague.
U.S. patent application Ser. No. 09/676,179, Gandhi, filed Sep. 29, 2000.

* cited by examiner

Primary Examiner—Nguyen T. Vo
Assistant Examiner—Simon Nguyen

(57) ABSTRACT

A method and apparatus for estimating the initial power level and transmission rate of a burst on a secondary channel when the secondary channel is on fewer legs of a handoff, such as a soft or softer handoff, than the primary channel. In accordance with the present invention, the initial power level of the burst transmitted over a current secondary channel on a particular leg(s) is a function of a power level of a previous burst transmitted over a previous secondary channel on the identical leg(s) as the current secondary channel. For example, the initial power level of the burst can be based on the power level at the end of the previous burst shortly prior to the termination of the previous burst, where the termination of the previous burst was within a predetermined time interval of the start of the burst. Optionally, the initial power level of a burst can also be additionally adjusted based on characteristics of the communication link of the primary channel, the previous secondary channel, and the current secondary channel. The transmission rate may then be adjusted based on the initial power level determined as described above to obtain a more efficient transmission rate.

36 Claims, 6 Drawing Sheets

POWER CONTROL AND TRANSMISSION RATE PARAMETERS OF A SECONDARY CHANNEL IN A WIRELESS COMMUNICATION SYSTEM

BACKGROUND OF THE INVENTION

This invention relates to wireless communication systems and, more particularly, to the transmission of data in such systems.

In wireless communication systems generally, base stations transmit signals to mobile terminals over a communication link referred to as a forward link, and mobile terminals transmit signals to base station over a communication link referred to as a reverse link. When a call—a communication session between a base station and a particular mobile terminal—is set up, a primary channel is set up on both a forward and reverse link. The primary channel can be used to transmit voice, data, and/or so-called signaling information, and transmits the signal at a particular, typically a fairly low, transmission rate. If it is desired to transmit a signal at a higher transmission rate, for example for a data transmission having a large amount of data, the wireless communication system may be able to set up a secondary channel—a communication channel over which signals may be transmitted at the same or at a higher transmission rate than that of the primary channel. The secondary channel is typically set up only over the particular communication link, i.e. forward or reverse, over which it is desired to transmit the signal.

The way in which the secondary channel is set up takes into account the fact that data is often bursty, meaning that it is transmitted in bursts interspersed with periods of inactivity during which no data is transmitted. Typically, the secondary channel is maintained only for the duration of each data burst. Between data bursts, there is no secondary channel assigned to the call, whereas there is a primary channel maintained for the duration of the call.

The transmission rate of the burst on the secondary channel is a critical factor affecting the efficiency of the wireless communication system. An unnecessarily low transmission rate leads to an unnecessarily long time to transmit the data and an inefficient use of air bandwidth resources. On the other hand, a too high transmission rate can result in a such a large amount of system resources being allocated to the call as to compromise the system's ability to service other calls, and in so-called sectors where such a large amount of resources are allocated it can cause the equipment servicing the sector to enter into overload.

Usually, the main factor that limits how high a transmission rate can be used on the secondary channel is the power needed to transmit the signal, and in particular the initial power level on the secondary channel. Thus, the initial power level on the secondary channel is a critical factor affecting system efficiency. A too low initial power level results in an unacceptable level of received signal quality, which may cause so-called link errors. On the other hand, a too high initial power level leaves little transmit power for the system to service other calls, which degrades the overall data throughput and efficiency of the communication link. Another disadvantage of a too high initial power level is that the signal's interference with calls involving other mobile terminals is increased unnecessarily, requiring that the power level of the signals on these calls be increased. At best, this further reduces the power available to service other mobile terminals and reduces the access furnished to new calls. At worst, if there is not enough power available to increase the power level of the signals on the other calls, one or more of those other calls may have to be dropped.

Advantageously, the wireless communication system's power control will eventually adjust the power level to produce an efficient power level that will result in an acceptable level of received signal quality without causing unnecessarily strong interference with calls involving other mobile terminals. However, during the time it takes power control to accomplish this, if the initial power level was too high, the signal will cause unnecessarily strong interference with other calls and leave little transmit power for the system to service other calls. If the initial power level was too low, then, during the time it takes the power control to adjust it, the signal will be received with an unacceptable level of received signal quality. Additionally, if there is a large difference between the initial power level and the efficient power level, then the power control may not even be able to adjust the power level to the efficient power level before the burst is over.

Therefore, it is desirable for the wireless communication system to accurately estimate the power level it will allocate to the burst initially. Typically, the wireless communication system will base the initial power level on the power level of a signal on the primary channel just before the start of the burst, as described, for example, in U.S. patent application Ser. No. 09/676,179 entitled "Forward Transmission rate Determination of High Data Transmission Rate Channels in CDMA Air Interface," assigned to the present assignee and hereby incorporated by reference.

Once the initial power level is accurately estimated, it can be used to determine an efficient transmission rate, which is typically the highest transmission rate supportable by the available system resources.

SUMMARY OF THE INVENTION

The present inventors have recognized that the above-mentioned technique for determining the initial power level, and therefore the efficient transmission rate, of a burst may not provide accurate results under certain circumstances, as will now be described. During at least a portion of a call, a mobile terminal may be involved in a so-called soft handoff, in which it is communicating with more than one base station. The communication links between the mobile terminal and a particular base station are each referred to as a "leg" of the handoff. When a secondary channel is established, it can be established on all the legs of the handoff. However, having the secondary channel on more than one leg of the handoff requires a significant amount of system resources and design complexity. Therefore, when conditions permit, it is known to establish the secondary channel on fewer than all the legs of the handoff. In such a case however, the communication-link characteristics of the primary channel of a particular leg are no longer similar to the communication-link characteristics of the secondary channel. This is caused by many factors including the fact that the communication-link characteristics on each of the legs of the handoff are both different and rapidly changing, and that there is no longer so-called space diversity on the secondary channel. We have thus recognized that the power level of a signal on the primary channel of a particular leg just before the start of the burst on the secondary channel is not necessarily an accurate indication of an appropriate initial power level for the burst on the secondary channel.

The present invention is a technique that allows for a more efficient initial power level, and therefore a more efficient transmission rate, for a secondary channel communication, for example a burst, when the secondary channel is on fewer legs of a handoff, such as a soft handoff, than the primary channel. In accordance with the invention, the initial power level of the burst transmitted over a current secondary channel on a communication link that includes a primary channel and a previous secondary channel is a function of a power level on the previous secondary channel, i.e. of a previous burst transmitted over the previous secondary channel. For example, the initial power level of the burst can be based on the power level prior to, or at, the termination of the previous burst, where the termination of the previous burst was within a predetermined time interval of the start of the burst. Preferably, the current secondary channel is on the identical legs of the handoff as the previous secondary channel. Optionally, the initial power level of a burst can also be a function of the characteristics of the communication link of the primary channel, the previous secondary channel, and the current secondary channel.

In accordance with a feature of the invention, the transmission rate may be adjusted based on the initial power level determined as described above to obtain a more efficient transmission rate. Particularly, the transmission rate may be adjusted based on whether the initial power level of the burst is acceptable in light of the power available at the power amplifier. In particular, the transmission rate can first be determined based on the system resources other than power. The initial power level is then determined using the above method with that transmission rate. If the initial power level is greater than the power available at the power amplifier, a lower transmission rate is selected and the initial power level is determined again using the above method but at the lower transmission rate.

DETAILED DESCRIPTION

Figure 1A:
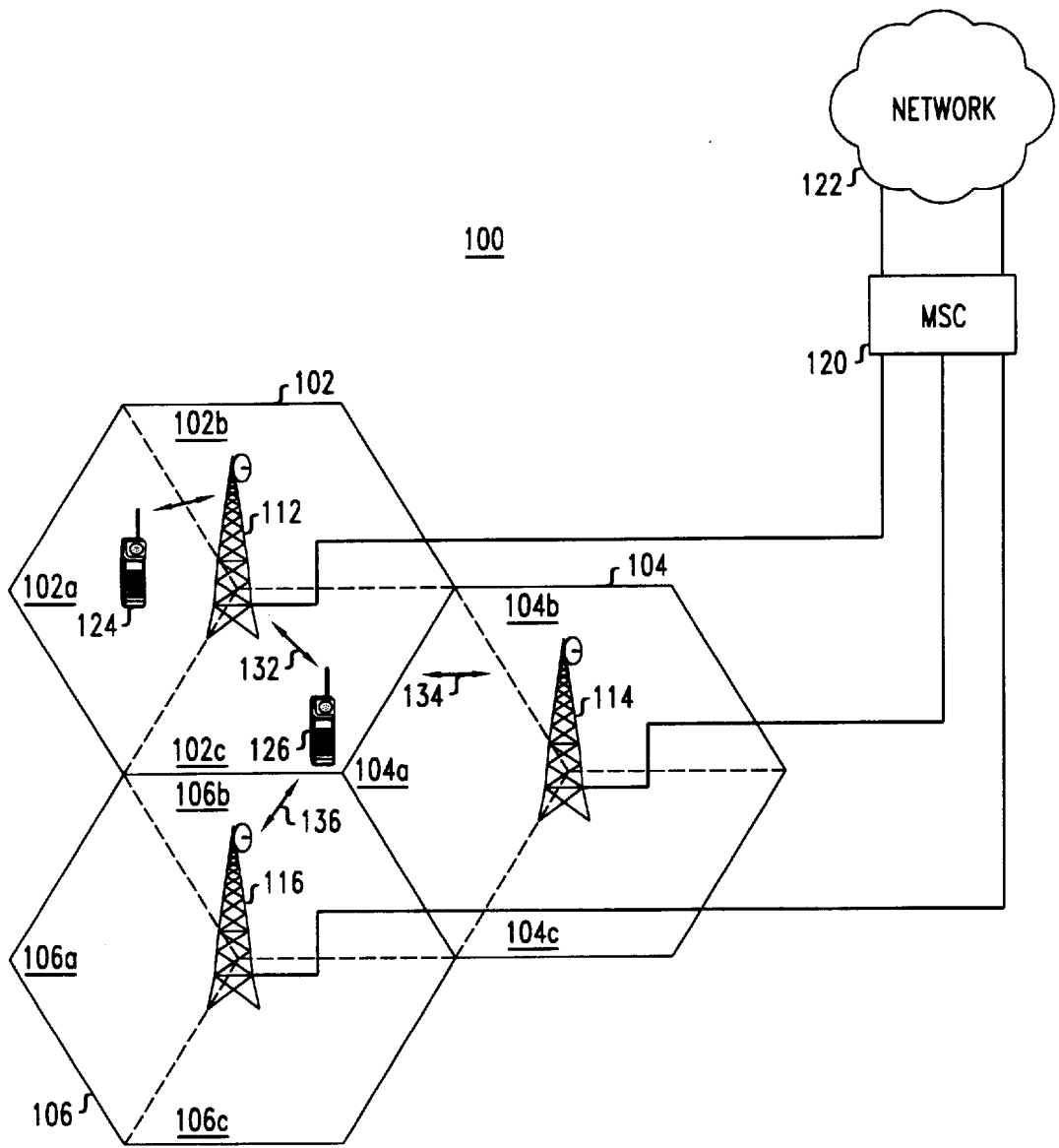
FIG. 1a illustrates a portion of a wireless communication system.

FIG. 1 illustrates a wireless communications system, such as Code Division Multiple Access (CDMA) system 100. The geographic area serviced by CDMA system 100 is divided into a plurality of spatially distinct areas called "cells." For ease of analysis, cells 102, 104, and 106 are typically approximated and schematically rep resented by hexagons in a honeycomb pattern. However, each cell is actually of an irregular shape that depends on the topography of the terrain surrounding the cell. Each cell 102, 104, 106 can be divided into a plurality of sectors, such as three 120° sectors. Cell 102 is divided into sectors 102a, 102b, and 102c; cell 104 is divided into sectors 104a, 104b, and 104c; and cell 106 is divided into sectors 106a, and 106b and 106c. Cell 102, 104, 106 contain base stations 112, 114, 116, respectively, each of which includes equipment to communicate with Mobile Switching Center ("MSC") 120. MSC 120 is connected to local and/or long-distance transmission network 122, such as a public switched telephone network. Each base station 112, 114, 116 also includes transmitters and/or receivers, and antennas. Typically, each base station includes different transmitters, receivers, and antennas for each sector that the base station serves. The base stations use the transmitters, receivers, and antennas to communicate with mobile terminals, such as mobile terminals 124, 126. The base stations transmit signals to the mobile terminals over a communication link referred to as a forward link, and the mobile terminals transmit signals to the base station over a communication link referred to as a reverse link.

When a call—a communication session between a base station, such as base station 112, and a particular mobile terminal, such as mobile terminal 124—is set up, a primary channel is set up on both a forward and reverse link. (In some systems, the primary channel is referred to as a fundamental channel.) The primary channel can be used to transmit voice, data, and/or so-called signaling information, and transmits the signal at a particular, typically a fairly low, transmission rate. If it is desired to transmit a signal at a higher transmission rate, for example for a data transmission having a large amount of data, the CDMA system checks, as described below, whether it is able to and it is advantageous to set up a secondary channel—a communication channel over which signals may be transmitted at the same or at a higher transmission rate higher than that of the primary channel. (In some systems the secondary channel is referred to as a supplemental channel or as a data channel.) The secondary channel is typically set up only over the particular communication link, i.e. forward or reverse, over which it is desired to transmit the signal.

The way in which the secondary channel is set up takes account of the fact that data is often bursty, meaning that it is transmitted in bursts interspersed by periods of inactivity during which no data is transmitted. Typically, the secondary channel is maintained only for the duration of each data burst. Between data bursts, there is no secondary channel assigned to the call, whereas there is a primary channel maintained for the duration of the call. Thus, the duration of the burst is shorter than the duration of the communication on the primary channel.

To determine whether CDMA system 100 is able to set up the secondary channel, the CDMA system first determines if the equipment allows for the higher transmission rate. If it does, then the CDMA system determines if it is advantageous to set up the secondary channel. It does this by determining if the amount of data to be transmitted is large enough that it would be transmitted faster over the secondary channel than over the primary channel taking into account the fact that no data is transmitted over the secondary channel during its set up time.

The CDMA system then determines what resources are available for the secondary channel. These resources are the various system resources, which include the number of so-called radios available for the communication link(s) that the secondary channel will use, the number of Walsh codes—orthogonal spreading sequences—available for each of these communication links, the power level available for each of these communication links, the hardware and software resources available for each of these communication links (for example the channel elements, CPU capacity, and radios), and the maximum transmission rate supportable at each of these communication links. The available resources are used to determine the transmission rate and initial power level of a burst transmitted over the secondary channel.

The transmission rate of the burst on the secondary channel is a critical factor affecting the efficiency of the wireless communication system. An unnecessarily low transmission rate leads to an unnecessarily long time to transmit the data and an inefficient use of air bandwidth resources. On the other hand, a too high transmission rate can result in a such a large amount of system resources being allocated to the call as to compromise the system's ability to service other calls, and in so-called sectors where such a large amount of resources are allocated it can cause the equipment servicing the sector to enter into overload.

Usually, the main factor that limits how high a transmission rate can be used on the secondary channel is the power needed to transmit the signal, and in particular the initial power level on the secondary channel. Thus, the initial power level on the secondary channel is a critical factor affecting system efficiency. A too low initial power level results in an unacceptable level of received signal quality, such as for example an unacceptable frame error transmission rate (FER) for the particular type of transmission. The FER is the number of so-called frames that contain non-correctable errors divided by the total number of frames observed. An unacceptable FER would require that either the errored frames, or an entire segment of the signal be re-transmitted. On the other hand, a too high initial power level leaves little transmit power for the system to service other calls. Another disadvantage of a too high initial power level is that the signal's interference with calls involving other mobile terminals is unnecessarily increased, requiring that the power level of the signals on these calls be increased. At best, this further reduces the power available to service other mobile terminals. At worst, if there is not enough power available to increase the power level of the signals on the other calls, one or more of those other calls may have to be dropped and new requests are rejected.

Advantageously, the wireless communication system's power control will eventually adjust the power level to produce an efficient power level that will result in an acceptable level of received signal quality without causing unnecessarily strong interference with calls involving other mobile terminal. However, during the time it takes power control to accomplish this, if the initial power level was too high, the signal will cause unnecessarily strong interference with other calls and leave little transmit power for the system to service other calls. If the initial power level was too low, then, during the time it takes the power control to adjust it, the signal will be received with an unacceptable level of received signal quality. Additionally, if there is a large difference between the initial power level and the efficient power level, then the power control may not have enough time to converge to the efficient power level during the entire duration of the burst.

Therefore, it is desirable for the CDMA system to accurately estimate the power level it will allocate to the burst initially. Typically, the wireless communication system will base the initial power level on the power level of a signal on the primary channel just before the start of the burst, as described, for example, in U.S. patent application Ser. No. 09/676,179 entitled "Forward Transmission Rate Determination of High Data Transmission rate Channels in CDMA Air Interface," assigned to the present assignee. Once the initial power level is accurately estimated, it can be used to determine an efficient transmission rate, which is typically the highest transmission rate supportable by the available system resources.

Figure 1B:
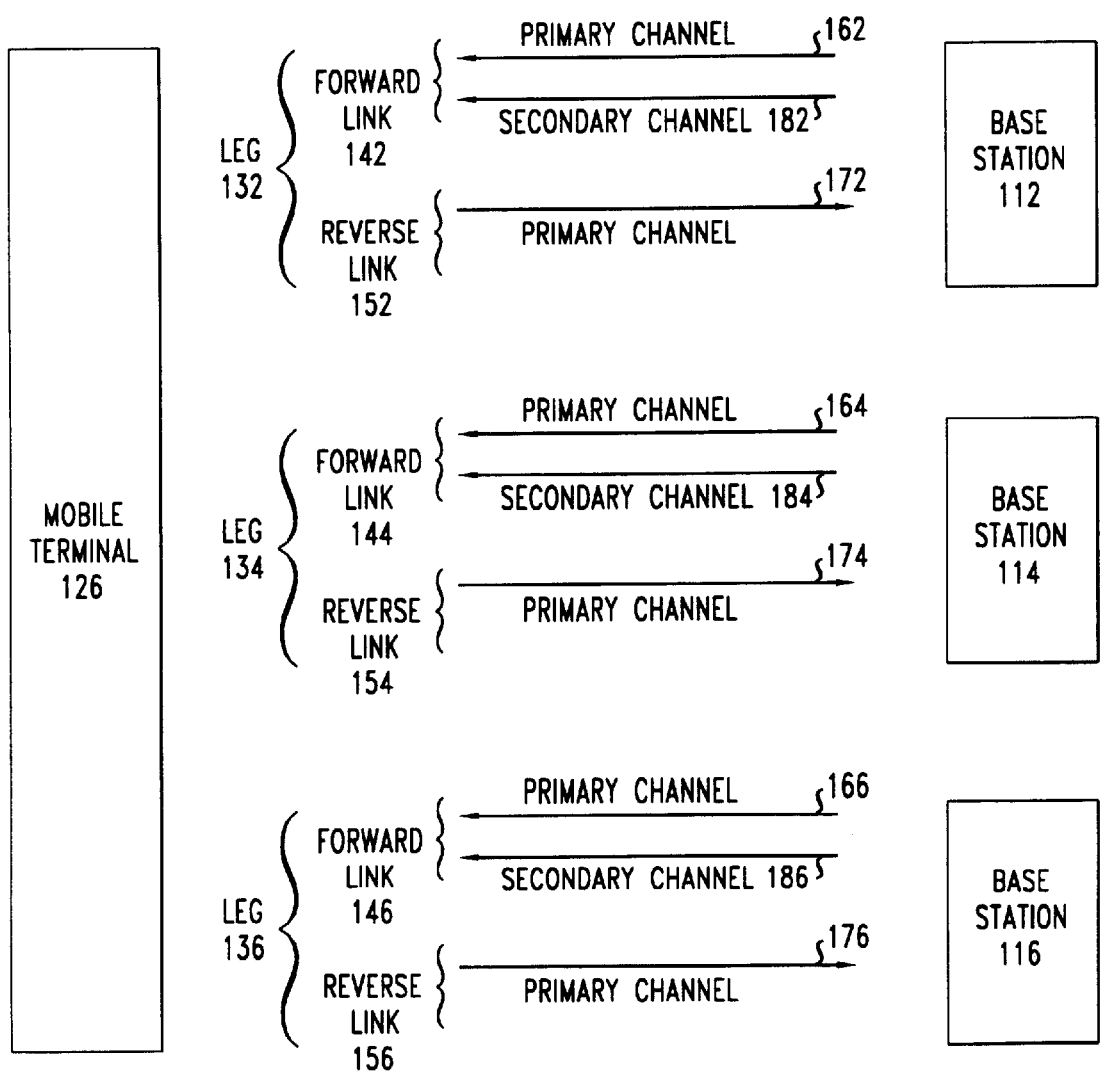
FIG. 1b illustrates the channels and communication links on the legs of the handoff when the secondary channel is on all of the legs of the handoff.

The present inventors have recognized that the above-mentioned technique for determining the initial power level, and therefore an efficient transmission rate, of a burst may not provide accurate results under certain circumstances, as will now be described. During at least a portion of a call, a mobile terminal, for example mobile terminal 126, may be involved in a so-called soft handoff, in which it is communicating with more than one base station, for example base stations 112, 114, and 116. The communication links between the mobile terminal and a particular base station are each referred to as a "leg" of the handoff. As can be seen in FIG. 1a, there is a leg 132, 134, and 136 between mobile terminal 126 and each of the base stations 112, 114, and 116 participating in the handoff, respectively. When a secondary channel is established, it can be established on all the legs of the handoff, as shown in FIG. 1b. Each of the legs 132, 134, and 136 includes a forward 142, 144, 146 and reverse 152, 154, and 156 link between mobile terminal 126 and each of the base stations 112, 114, and 116, respectively. As described above, there is a primary channel 162, 164, and 166 on each of the forward links 142, 144, 146, respectively, and a primary channel 172, 174, and 176 on each of the reverse links 152, 154, 156, respectively. There is also a secondary channel 182, 184, 186 on the communication link of each of the legs over which data is to be transmitted, in this case forward links 142, 144, 146, respectively.

Figure 1C:
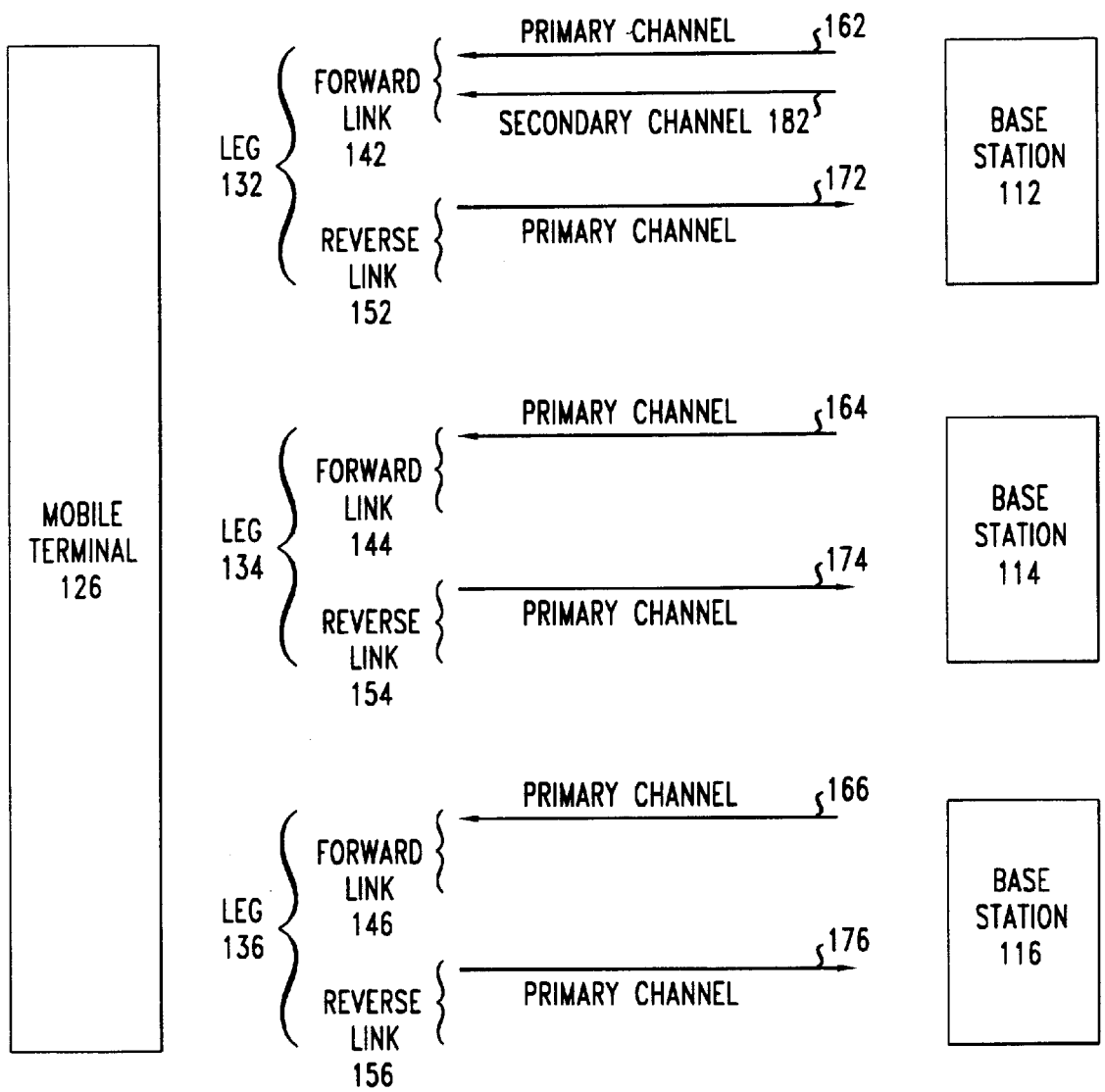
FIG. 1c illustrates the channels and communication links on the legs of the handoff when the secondary channel is on fewer than all of the legs of the handoff.

However, having the secondary channel on more than one leg of the soft handoff requires a significant amount of system resources and under certain circumstances reduces system performance. Therefore, when conditions permit, it is known to establish the secondary channel on fewer than all the legs of the soft handoff. FIG. 1c shows such a case. In this case, each of leg 132, 134, and 136 still includes forward 142, 144, 146 and reverse 152, 154, and 156 links, and there is still a primary channel 162, 164 and 166, and 172, 174 and 176 on each of the forward and reverse links, respectively. However, in this case the secondary channel 182 is only on the forward link of one of the legs, in this case leg 132. There is no secondary channel on legs 134 and 136. (Although the secondary channel is shown as being on one leg of the handoff, other combinations of secondary channels are possible. The secondary channels can be on any subset of the legs over which the primary channel is established.)

In such a case, the communication-link characteristics of the primary channel of a particular leg are no longer similar to the communication-link characteristics of the secondary channel. This is caused by many factors. One of these factors is that the communication-link characteristics on each of the legs 132, 134, and 136 of the handoff are both different and rapidly changing. Thus, when the characteristics of the communication link of one of the legs, for example leg 132, change drastically, such for example when the fading on forward link 142 changes drastically, the combined signal received by mobile terminal 126 may still be received with an acceptable level of signal quality because this signal is also transmitted on the other primary channels, 164, and 166. However, if secondary channel 182's initial power level was based on the power level of this primary channel just after the characteristics changed drastically, then this initial power level will most likely not produce an acceptable received signal quality.

Another of the factors why the communication-link characteristics of the primary channel of a particular leg are no longer similar to the communication-link characteristics of the secondary channel is that there is no so-called space diversity on the secondary channel. When a signal is transmitted on several channels—for example, on the three primary channels 162, 164, and 166—all the information received on all three channels can be used to recover the transmitted information, increasing the reliability of the link. Because secondary channel 182 is on only one communication link 142, it thus becomes more critical that the communication-link characteristics on this link do not produce a received signal with an unacceptable FER, since an unacceptable FER would reduce the reliability of the link.

The inventors have thus recognized that during a soft handoff the power level of a signal on primary channel 162 of leg 132 just before the start of the burst on secondary channel 182 is not necessarily an accurate indication of an appropriate initial power level for the burst over secondary channel 182.

The present invention is a technique that allows for a more efficient initial power level, and therefore a more efficient transmission rate, for a burst on a secondary channel when the secondary channel is on fewer legs of a handoff, such as a soft handoff, than the primary channel. In accordance with the invention, the initial power level of the burst transmitted over a current secondary channel on a particular leg, or legs, is a function of a power level of a previous burst transmitted over a previous secondary channel on the identical leg, or legs, as the current secondary channel. For example, as shown in FIG. 2, the initial power level of burst 220, i.e. the power level at the start of burst 220 (at time $t_2$) is based on the power level at the end of burst 210 shortly prior to the termination of the previous burst (at $t_1$).

Optionally, the initial power level of a burst can also be a function of the characteristics of the communication link of the primary channel, the previous secondary channel, and the current secondary channel. The characteristics of the communication link of the primary channel include: the 1) power level, 2) transmission rate, and 3) space diversity on the primary channel (i.e. the of the signal on the primary channel) at, or prior to, the end of the previous burst; and the 4) power level, 5) transmission rate, and 6) space diversity of the primary channel at or just prior to the start of current burst. The characteristic of the communication link of the current secondary channel includes the desired transmission rate of the current secondary channel and the space diversity of the current secondary channel. The characteristics of the communication link of the previous secondary channel include the power level of the previous secondary channel, and the transmission rate of the previous secondary channel and the space diversity of the current secondary channel.

Figure 2:
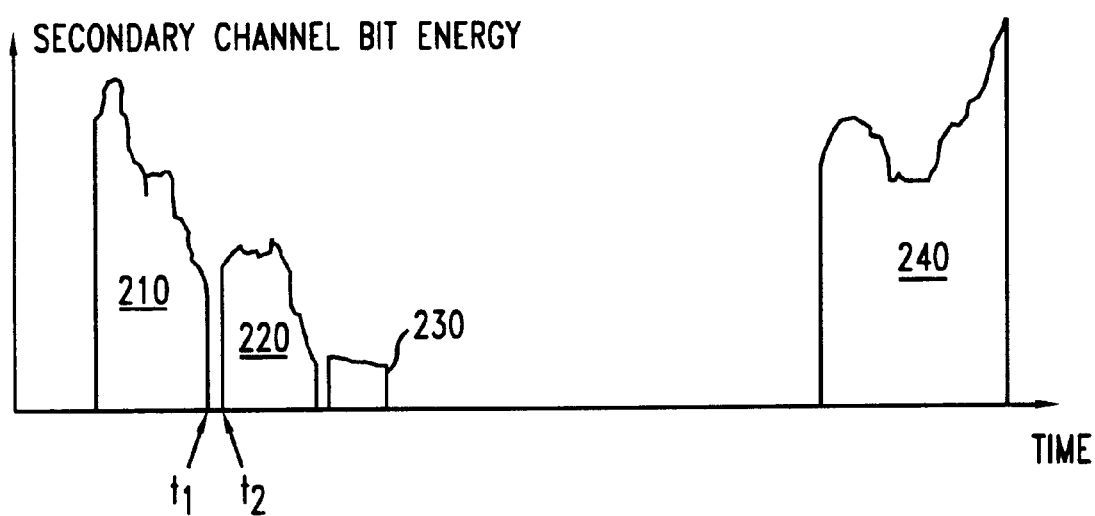
FIG. 2 illustrates the secondary channel power level.

As can be seen in FIG. 2, the power level at the end of the previous burst is a good indication for the initial power level of the current burst where the termination of the previous burst was within a predetermined time interval, for example within 3 seconds, of the start of the burst in systems meant to be used in low speed environments, and within a shorter time period in systems meant to be used in higher speed environments. Because the conditions of the communication links change over time, once enough time passes the conditions of the communication link are different enough that the same power level will no longer produce the same FER. The predetermined time interval is selected as a result of a tradeoff between a) the desire to be more sure that the conditions of the communication link have not changed, to increase the likelihood that the same power level will produce the same FER, and b) the desire to increase the predetermined time interval, to increase the circumstances in which the learned measurements can be reused, i.e., the power level of the current burst is a function of the previous burst.

When the power level at the end of the previous burst is not a good indication of the initial power level of the current burst, the initial power level has to be estimated independently of the previous burst. This is the case when the current burst is the first burst of the communication, for example burst 210, or the first burst on this particular leg or set of legs, or when the time between the current and previous bursts is longer than the predetermined time interval, for example burst 230 and 240. (Note that when the leg over which the previous secondary channel was established is not the leg over which the current secondary channel will be established, the power level at the end of the previous burst is not a good indication of the initial power level of the current burst.)

In the cases described in the previous paragraph, the initial power level of the current burst is determined using the power level of the primary channel and the power available at the power amplifier. Preferably, the initial power level is determined conservatively, by only allowing the initial power level to be at most a predetermined fraction, for example between 50% and 75%, of the power amplifier's available power. By allowing the initial power level to be at most a predetermined fraction of the power amplifier's power, the method leaves reserve power for the power control to increase the power level if necessary. The predetermined fraction is selected as a tradeoff between 1) the desire to leave enough reserve for the power control to be able to increase the power level, and 2) the desire to allow the initial power level to be large enough to be able to transmit the burst at the largest transmission rate allowed by the other system resources.

In accordance with an illustrative embodiment of the invention the transmission rate may be adjusted based on whether the initial power level of the burst at the transmission rate is acceptable in light of the power available at the power amplifier. For example, the transmission rate can be determined based on the system resources other than power. The initial power level is then determined using the above method with this transmission rate. If the initial power level is greater than the power available at the power amplifier a lower transmission rate is selected and the initial power level is determined using this transmission rate.

Figure 3:
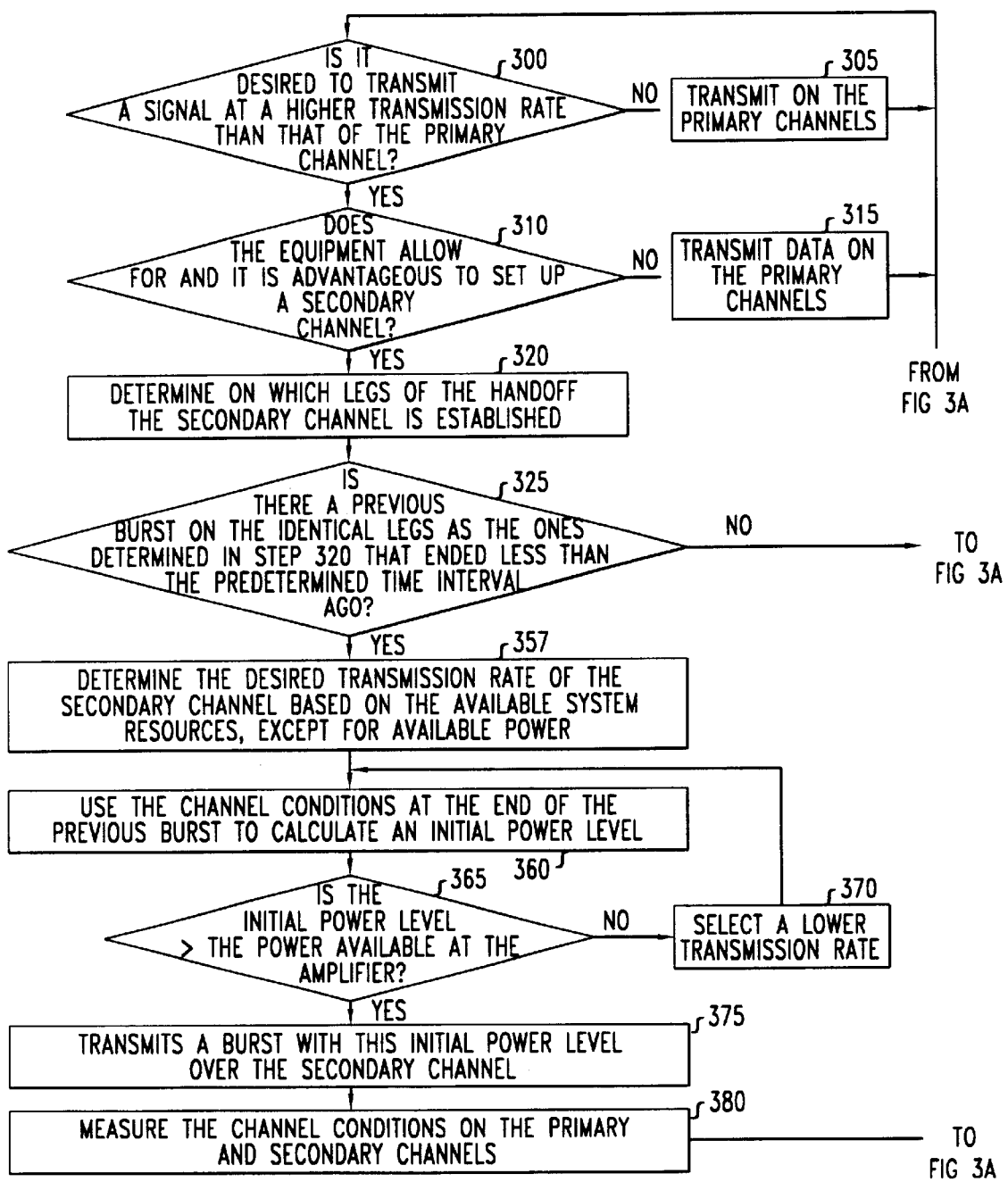
FIG. 3 is a flowchart showing an illustrative secondary-channel initial power level technique and embodying the principles of the present invention.
Figure 3A:
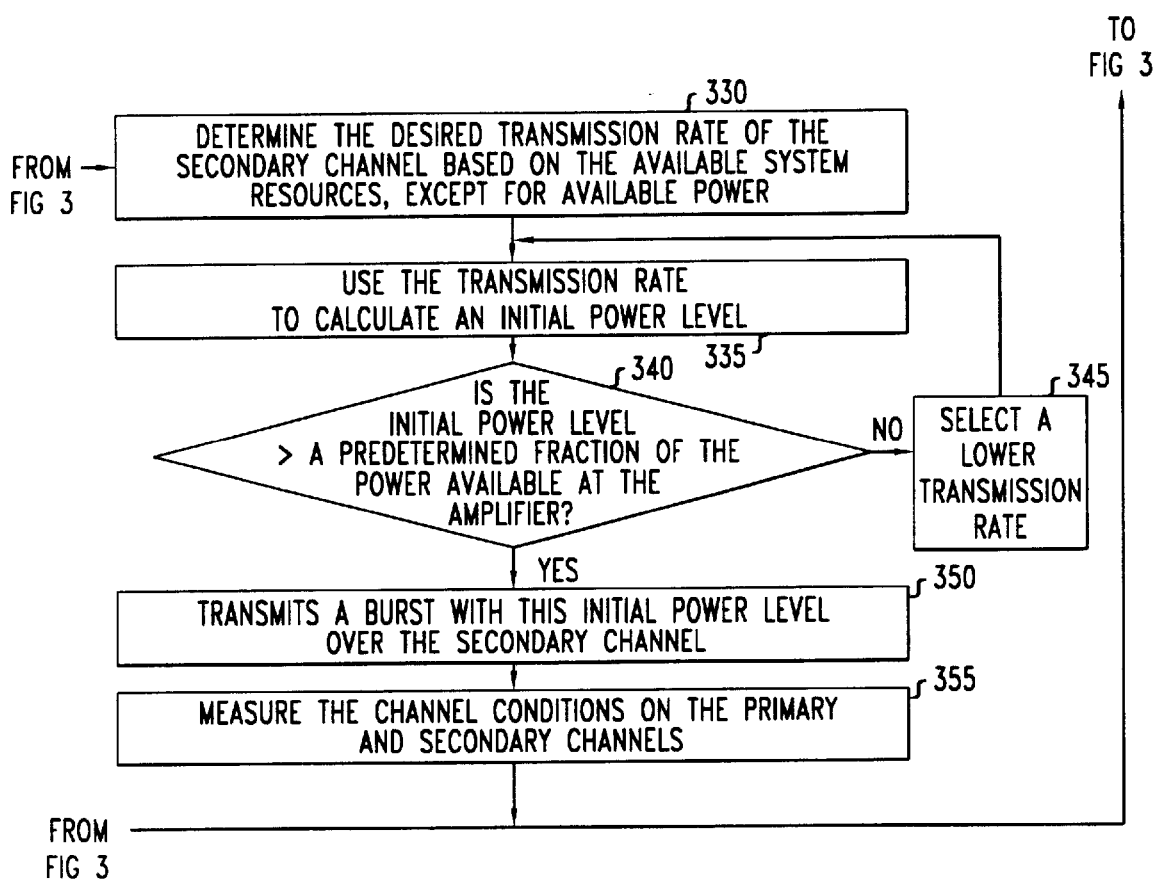

FIG. 3 illustrates the flow of the process of operation of CDMA system 100 in accordance with an embodiment of the present invention. The individual boxes in the flowchart of FIG. 3 are described as process steps. However, those boxes can be equally understood as representing program instructions stored in a memory of CDMA system 100 and executed by a processor of CDMA system 100, to effectuate the respective process steps.

The operation of CDMA system 100 in accordance with an embodiment of the present invention is now described with reference to FIGS. 2 and 3. During a call that is in soft handoff, it is determined if it is desired to transmit a signal at a higher transmission rate than the transmission rate of the primary channel, step 300. Typically, the MSC notifies the primary base station—the base station that processes the signaling information during the handoff—when the MSC has a large amount of data to be transmitted to one of the mobile terminals communicating with the primary base station. For example, the MSC notifies the primary base station by requesting that a secondary channel be set up. If there is no request for a secondary channel the base stations continue to transmit over the primary channels, step, 305, and the process returns to step 300.

If there is a request for a secondary channel, it is determined whether there are hardware and software resources and it is advantageous to set up a secondary channel, step 310. If the answer in steps 310 is NO, all of the base stations participating in the soft handoff transmit the data on the primary channels, step 315, and the process returns to step 300. If the answer in step 310 is YES, it is determined on which legs of the handoff the secondary channel is to be established, step 320. This can be performed in any manner. If the secondary channel is to be established on fewer legs than the primary channel, the leg, or legs, on which the secondary channel is to be established is referred to as an anchor leg, or anchor legs.

Then, in step 325, it is determined if there is a previous burst on the identical legs as the ones determined in step 320 that ended less than the predetermined time interval ago. If there is no such burst, the answer in step 325 is NO, the system determines a conservative initial power level of the current burst based on the power level of the primary channel and the power amplifier's available power. One illustrative way of performing this step is by first determining the desired transmission rate of the secondary channel based on the available system resources, except for available power, step 330. Then, multiplying the number of times the desired transmission rate is larger than the rate of the primary channel by the power level of the signal on the primary channel and by the number of legs over which the primary channel is established (typically, the number of legs of the handoff to calculate an initial power level, step 335. The CDMA system then checks if this initial power level is greater than a predetermined fraction of the power amplifier's available power $A_{AP}$, for example, $(0.75 \times A_{AP})$ step 340. If it is greater than $(0.75 \ast A_{AP})$ then a lower transmission rate is selected, step 345, and the process returns to step 335 to recalculate the initial power level using this lower transmission rate.

If the initial power level is less or equal to $(0.75 \ast A_{AP})$, then the CDMA system establishes the secondary channel and transmits a burst with this initial power level over the secondary channel, step 350. As the burst is transmitted, the power control adjusts the power level to achieve an efficient power level on the secondary channel. Before the burst is completed, preferably at the end of the burst, the transmission rates of the secondary and primary channels are recorded and the power level of the signal on the primary channel and the power level of the burst on secondary channel are measured and recorded so they may be used for future secondary channel requests, step 355. A time stamp is added to these measurements in order to determine their age when they are used in determining the initial power level of a future secondary channel, and the process returns to step 300.

If the answer in step 325 is YES, i.e. there was a previous burst on the identical legs as the ones determined in step 320 that ended less than the predetermined time interval ago, then the system determines the desired transmission rate of the secondary channel based on the available system resources, except for available power, step 357 and proceeds to step 360. Advantageously, in step 360, the communication-link characteristics at the end of the previous burst are used to determine the initial power level of the current burst. Illustratively, equation 1 provides the power level at time $t_2$, i.e. the initial power level of the current burst, where the chip energy $E_{Ca}$ is used as a way of expressing power levels.

$$\left(\frac{E_{Ca}^S}{E_{Ca}^P}\right)_{BS}(t_2) = \left(\frac{E_{Ca}^S}{E_{Ca}^P}\right)_{BS}(t_1) \ast \left[\frac{R_{SCH}(t_2) \ast \text{space diversity offset}(t_2) \ast \text{rate offset}(t_2) \ast \left(\frac{E_{Ca}^F}{E_{Ca}^P}\right)_{BS}(t_2)}{R_{SCH}(t_1) \ast \text{space diversity offset}(t_1) \ast \text{rate offset}(t_1) \ast \left(\frac{E_{Ca}^F}{E_{Ca}^P}\right)_{BS}(t_1)}\right] \quad (1)$$

Where:
$R_{SCH}(t)$=the secondary channel's transmission rate at time t;
$E_{Ca}^F(t)$=the primary channel's chip energy at time t on the leg on which the secondary channel will be established;
$E_{Ca}^S(t)$=the secondary channel's chip energy at time t on the leg on which the secondary channel will be established;
$E_{Ca}^P(t)$=the pilot signal's chip energy on the leg on which the secondary channel will be established at time t, where the pilot signal is a direct-sequence spread spectrum signal transmitted continuously by each base station; and
the subscript BS means that this is the energy at the base station.

The space diversity offset takes into account the space diversity of the secondary channel relative to the primary channel, which is based on the number of legs on which the primary channel is established, the number of legs on which the secondary channel is established, and on relative strength of the pilot signals on this communication link. The space diversity offset can be determined once, for example by computer simulation, and then tabulated and used in equation 1. The space diversity offset can be obtained by simulating a soft handoff and varying 1) the strength of the pilots, 2) the number of legs on which the primary channel is established, and 3) which of these legs the secondary channel will be established, i.e. on how many and on which ones. The space diversity offset will vary the most in the cases where the primary channel is established on either two or three legs, as the number of legs increases the value of the space diversity offset will start to converge.

The rate offset takes into account the gain due to the fact the value for the target FER—the FER produced by the efficient power level, changes based on transmission rates. Like, the space diversity offset, the rate offset can be determined once, for example by simulation, and then tabulated and used in equation 1. The rate offset can be obtained by simulating a soft handoff and varying the target FER.

Equation 1 is explained in more detail in the section below entitled Equation 1.

The ratio of the chip energy of the secondary channel to that of the pilot signal $$\left(\frac{E_{Ca}^S}{E_{Ca}^P}\right)_{BS}(t_2)$$

obtained in equation 1 is the ratio of the initial power level of the secondary channel to power level of the pilot signal. The CDMA system then checks if this initial power level is greater than the power amplifier's available power $A_{AP}$, step 365. If it is greater than $A_{AP}$ then a lower transmission rate is selected, step 370, and the process returns to step 360 to recalculate the initial power level using this lower transmission rate.

If the initial power level is less or equal to $A_{AP}$, then the CDMA system establishes the secondary channel and transmits a burst with this initial power level over the secondary channel, step 375. As the burst is transmitted the secondary channel power control adjusts the power level to achieve an efficient power level on the secondary channel. Before the burst is completed, preferably at the end of the burst the transmission rates of the secondary and primary channels is recorded the power level of the signal on the primary channel and the power level of the burst on secondary channel are measured and recorded so they may be used for future secondary channel requests, step 380. A time stamp is added to these measurements in order to determine their age when they are used in determining the initial power level of a future secondary channel, and the process returns to step 300.

Equation 1

As can be seen in FIG. 2, when one burst, for example burst 220 starts shortly after the end of another burst, such as burst 210, the power level at the end of burst 210 is a good indication for the initial power level of burst 220. If there were any changes in communication-link characteristics between the time when the previous burst ended, $t_1$, and the time when the next burst started, $t_2$, they would be on both the primary and on the secondary channels, so the ratio of the bit energy between the secondary channel and primary channel at time $t_1$ and $t_2$ should be equal. Thus, $$\frac{E_b^S(t_1)}{E_b^F(t_1)} = \frac{E_b^S(t_2)}{E_b^F(t_2)} \quad (2)$$

Since the space diversity and secondary channel transmission rate may have also changed between $t_1$ and $t_2$ equation 2 should be corrected for this, resulting in:

$$\frac{E_b^S(t_1)}{\text{space diversity offset}(t_1) * \text{rate offset}(t_1) * E_b^F(t_1)} = \frac{E_b^S(t_2)}{\text{space diversity offset}(t_2) + \text{rate offset}(t_2) * E_b^F(t_2)} \quad (3)$$

In a CDMA system:

$$E_b^S(t) = \frac{W}{R_{SCH}(t)} E_{Ca}^S(t), \quad (4)$$

$$E_b^F(t) = \frac{W}{R_{FCH}(t)} E_{Ca}^F(t), \quad (5)$$

where:
$R_{FCH}(t)$=primary channel's transmission rate at time t;
W=CDMA chip rate (1.2288 M Chips/sec);
$E_b^F(t)$=primary channel's bit energy at the base station at time t;
$E_b^S(t)$=secondary channel's bit energy at the base station at time t.
The rate on the primary channel does not change $$R_{FCH}(t_1) = R_{FCH}(t_2) \quad (6)$$

Substituting equations (4), (5), and (6) into equation (3) produces equation 1:

$$\left(\frac{E_{Ca}^S}{E_{Ca}^P}\right)_{BS}(t_2) = \left(\frac{E_{Ca}^S}{E_{Ca}^P}\right)_{BS}(t_1) * \left[\frac{R_{SCH}(t_2) * \text{space diversity offset}(t_2) * \text{rate offset}(t_2) * \left(\frac{E_{Ca}^F}{E_{Ca}^P}\right)_{BS}(t_2)}{R_{SCH}(t_1) * \text{space diversity offset}(t_1) * \text{rate offset}(t_1) * \left(\frac{E_{Ca}^F}{E_{Ca}^P}\right)_{BS}(t_1)}\right] \quad (1)$$

The foregoing is merely illustrative and various alternatives will now be discussed. The illustrative embodiment is described with the base stations participating in a soft handoff. However, in alternative embodiments of the invention the base stations can be in softer handoff. A call is in softer handoff when the mobile terminal receives fairly strong pilot signals from two of more sets of communication equipment, typically located in the same base station, each set of communication equipment serving a different so-called sector of a cell of the wireless communication system. There is a leg of the handoff between each set of equipment and the mobile terminal.

The illustrative embodiment is described with the wireless communication system being a CDMA system. However, in alternative embodiments the wireless communication system can be any system capable of establishing secondary channels. This method is particularly useful in wireless communication systems where the secondary channel can be established on fewer than all of the legs of a handoff. This method is also particularly useful in wireless communication systems where the conditions of the communication links change, such for example when the fading on the communication links changes, and particularly when the fading changes drastically.

The illustrative embodiment is described with three base stations participating in a soft handoff. However, in alternative embodiments any number of base stations can participate in the soft or softer handoff.

In the illustrative embodiment, the process steps of FIG. 3 are performed in the base station that is one end of the leg over which the secondary channel is established. However, in alternative embodiment of the invention these steps can be performed in any part of the wireless communication system, for example in the MSC.

In the illustrative embodiment the process steps of FIG. 3 are implemented using software. One skilled in the art will realize that in alternative embodiments hardware can be used to implement the functionality of this software.

The illustrative embodiment is described with base station including a transmitter and a burst being transmitted over the forward link, i.e. from the base station to the mobile terminal. However, one skilled in the art will realize that the burst can be transmitted over the reverse link, i.e. from the mobile terminal to base station, in addition to, or instead of, from the base station to the mobile terminal using the methods described above. Typically, in most current system, on the reverse link, the secondary channel is set up on the same legs as the primary channel. In such a case, is advantageous to use the power of the primary channel to estimate the initial power level of a burst on the secondary channel. However, if on the reverse link the secondary channel is set up on a subset of the legs of the primary channel, then it is advantageous to use the method of the present invention to determine the initial power level and the transmission rate for the burst on the secondary channel over the reverse link.

In the illustrative embodiment of the invention the transmission rate is adjusted based on the initial power level. In alternative embodiments of the invention, the initial power level can be used in determining other characteristics of the communication link in addition to, or instead of, the transmission rate.

In the illustrative embodiment of the invention the power that can be used for the initial power level is all or a predetermined fraction of the amplifier's available power. In alternative embodiments of the invention, some power may be reserved for other uses. Thus, the power that can be used for the initial power level can be just the power that is available of the secondary channel.

The present invention is applicable in system where the secondary channels can support only transmission rates that are a whole number multiple of the transmission rate of the primary channel, as well as systems that do not place this restriction on the secondary channel.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a wireless communication system having at least one communication link including a primary channel over which a primary channel communication is transmitted, and wherein a previous secondary channel communication was transmitted on a previous secondary channel on the at least one communication link, the method comprising the steps of:

prior to a termination of the transmission of the primary communication, obtaining an initial power level for a subsequent secondary channel communication, the initial power level being a function of a power level of the previous secondary channel communication;

determining whether a predetermined time interval from termination of the previous secondary channel has elapsed; and if the predetermined time interval has not elapsed, transmitting the subsequent secondary channel communication using the initial power level.

2. The method of claim 1, wherein the obtaining step is performed responsive to the subsequent secondary channel being established within the predetermined time interval.

3. The method of claim 2, wherein the communication link is between a transmitter and a receiver, the transmitter comprising a power amplifier, and the wherein method further comprises, if the predetermined time interval has elapsed, performing the steps of:

obtaining the initial power level for the subsequent secondary channel communication based on a power level on the primary channel communication and a desired transmission rate for the subsequent secondary channel; and responsive to the initial power level being greater than a predetermined fraction of a power available at the power amplifier:
      selecting a lower transmission rate for the subsequent secondary channel; and
      recalculating the initial power level based on the power level on the primary channel communication and the lower transmission rate.

4. The method of claim 1, wherein:

the subsequent secondary channel and the previous secondary channel are established during a handoff, the handoff having at least two legs each being between a terminal and one of at least two sets of communication equipment, each of the legs including at least one of the at least one communication link; and the obtaining step is performed responsive to the subsequent secondary channel being established on the identical legs of the handoff as the previous secondary channel.

5. The method of claim 4, wherein the communication link is between a transmitter and a receiver, the transmitter comprising an power amplifier, and the method further comprises, responsive to the subsequent secondary channel being established on different legs of the handoff than the previous secondary channel, performing the steps of:

obtaining the initial power level for the subsequent secondary channel communication based on a power level on the primary channel communication and a desired transmission rate for the subsequent secondary channel;

responsive to the initial power level being greater than a predetermined fraction of a power available at the power amplifier:
      selecting a lower transmission rate for the subsequent secondary channel; and
      recalculating the initial power level based on the power level on the primary channel communication and the lower transmission rate.

6. The method of claim 1, wherein the communication link is between a transmitter and a receiver, the transmitter comprising a power amplifier, and the obtaining step comprises the steps of:

obtaining the initial power level for the subsequent secondary channel communication based on the power level of the previous secondary channel communication and a desired transmission rate for the subsequent secondary channel;

responsive to the initial power level being greater than a power available for the subsequent secondary channel at the power amplifier:
      selecting a lower transmission rate for the subsequent secondary channel; and
      recalculating the initial power level based on the power level of the previous secondary channel communication and the lower transmission rate.

7. The method of claim 1, wherein the initial power for the subsequent secondary channel communication is additionally a function of characteristics of the communication link of the primary channel, characteristics of the communication link of the previous subsequent secondary channel, and characteristics of the communication link for the subsequent secondary channel.

8. The method of claim 7, wherein:

the characteristics of the communication link of the previous secondary channel comprise a transmission rate of the previous secondary channel;

the characteristics of the communication link for the subsequent secondary channel comprise a desired transmission rate for the subsequent secondary channel; and the characteristics of the communication link of the primary channel are based on at least one of:
      a power level of a signal on the primary channel prior to a termination of the previous burst;
      a transmission rate on the primary channel prior to the termination of the previous burst;
      a space diversity on the primary channel prior to the termination of the previous burst;
      a power level of a signal on the primary channel shortly prior to an establishment for the subsequent secondary channel;

a transmission rate on the primary channel shortly prior to the establishment for the subsequent secondary channel; and a space diversity on the primary channel shortly prior to the establishment for the subsequent secondary channel.

9. A method for use in a wireless communication system having at least one communication link including a primary channel over which a primary channel communication is transmitted, and wherein a previous secondary channel communication was transmitted on a previous secondary channel on the at least one communication link, the method comprising the step of:

prior to a termination of the transmission of the primary channel communication, obtaining an initial power level for a subsequent secondary channel communication, as a function of a power level of the previous secondary channel communication;

determining whether a predetermined time interval from termination of the previous secondary channel has elapsed; and if the predetermined time interval has not elapsed, transmitting the subsequent secondary channel communication using the initial power level and at a transmission rate that is a function of the initial power level.

10. The method of claim 9, wherein the obtaining step is performed responsive to the subsequent secondary channel being established within the predetermined time interval.

11. The method of claim 10, wherein the communication link is between a transmitter and a receiver, the transmitter comprising a power amplifier, and the method further comprises, if the predetermined time interval has elapsed, performing the steps of:

obtaining the initial power level for the subsequent secondary channel communication based on a power level on the primary channel communication and a desired transmission rate for the subsequent secondary channel; and responsive to the initial power level being greater than a predetermined fraction of a power available at the power amplifier:

selecting a lower transmission rate for the subsequent secondary channel; and recalculating the initial power level based on the power level on the primary channel communication and the lower transmission rate.

12. The method of claim 9, wherein:

the subsequent secondary channel and the previous secondary channel are established during a handoff, the handoff having at least two legs each being between a terminal and one of at least two sets of communication equipment, each of the legs including at least one of the at least one communication link; and the obtaining step is performed responsive to the subsequent secondary channel being established on the identical legs of the handoff as the previous secondary channel.

13. The method of claim 12, wherein communication link is between a transmitter and a receiver, the transmitter comprising a power amplifier, and the method further comprises, responsive to the subsequent secondary channel being established on different legs of the handoff than the previous secondary channel, performing the steps of:

obtaining the initial power level for the subsequent secondary channel communication based on a power level on the primary channel communication and a desired transmission rate for the subsequent secondary channel;

responsive to the initial power level being greater than a predetermined fraction of a power available at the power amplifier:

selecting a lower transmission rate for the subsequent secondary channel; and recalculating the initial power level based on the power level on the primary channel communication and the lower transmission rate.

14. The method of claim 9, wherein the communication link is between a transmitter and a receiver, the transmitter comprising an power amplifier:

the obtaining step comprises obtaining the initial power level for the subsequent secondary channel communication based on the power level of the previous secondary channel communication and a desired transmission rate for the subsequent secondary channel; and the transmitting step comprises, responsive to the initial power level being greater than a power available for the subsequent secondary channel at the power amplifier, performing the steps of:

selecting a lower transmission rate for the subsequent secondary channel; and recalculating the initial power level based on the power level of the previous secondary channel communication and the lower transmission rate; and transmitting the subsequent secondary channel communication at the initial power level and at the transmission rate, the transmission rate being the lower transmission rate.

15. The method of claim 9, wherein the initial power for the subsequent secondary channel communication is additionally a function of characteristics of the communication link of the primary channel, characteristics of the communication link of the previous secondary channel, and characteristics of the communication link for the subsequent secondary channel.

16. The method of claim 15, wherein:

the characteristics of the communication link of the previous secondary channel comprise a transmission rate of the previous secondary channel;

the characteristics of the communication link for the subsequent secondary channel comprise a desired transmission rate for the subsequent secondary channel; and the characteristics of the communication link of the primary channel are based on at least one of:

a power level of a signal on the primary channel prior to a termination of the previous burst;

a transmission rate on the primary channel prior to the termination of the previous burst;

a space diversity on the primary channel prior to the termination of the previous burst;

a power level of a signal on the primary channel shortly prior to an establishment for the subsequent secondary channel;

a transmission rate on the primary channel shortly prior to the establishment for the subsequent secondary channel; and a space diversity on the primary channel shortly prior to the establishment for the subsequent secondary channel.

17. A method for use in a wireless communication system having at least one communication link including a primary channel over which a primary channel communication is transmitted, the method comprising the steps of:

establishing a first secondary channel on the at least one communication link;

transmitting a first signal burst over the secondary channel;

terminating the first secondary channel;

prior to a termination of the transmission of the primary channel communication, obtaining an initial power level of a second signal burst to be transmitted over a second secondary channel as a function of a power level of the first signal burst;

determining a transmission rate for the second secondary channel as function of the initial power level;

determining whether a predetermined time interval from termination of the first secondary channel has elapsed; and if the predetermined time interval has not elapsed, transmitting the second signal burst using the initial power level.

18. The method of claim 17, wherein the obtaining step is performed responsive to the second secondary channel being established within the predetermined time interval.

19. The method of claim 18, wherein the communication link is between a transmitter and a receiver, the transmitter comprising a power amplifier, and the method further comprises, if the predetermined time interval has elapsed, performing the steps of:

obtaining the initial power level for the second signal burst based on the power level of a primary channel communication and a desired transmission rate for the second secondary channel; and responsive to the initial power level being greater than a predetermined fraction of a power available at the power amplifier:
selecting a lower transmission rate for the second secondary channel; and
recalculating the initial power level based on the power level on the primary channel communication and the lower transmission rate.

20. The method of claim 17, wherein:

the second secondary channel and the first secondary channel are established during a handoff, the handoff having at least two legs each being between a terminal and one of at least two sets of communication equipment, each of the legs including at least one of the at least one communication link; and the obtaining step is performed responsive to the second secondary channel being established on the identical legs of the handoff as the first secondary channel.

21. The method of claim 20, wherein the communication link is between a transmitter and a receiver, the transmitter comprising a power amplifier, and the method further comprises, responsive to the second secondary channel being established on different legs of the handoff than the first secondary channel, performing the steps of:

obtaining the initial power level for the second signal burst based on a power level on the primary channel communication and a desired transmission rate for the second secondary channel;

responsive to the initial power level being greater than a predetermined fraction of a power available at the power amplifier:
selecting a lower transmission rate for the second secondary channel; and
recalculating the initial power level based on the power level on the primary channel communication and the lower transmission rate.

22. The method of claim 17, wherein the communication link is between a transmitter and a receiver, the transmitter comprising a power amplifier, the obtaining step comprises the steps of:

obtaining the initial power level for the second secondary channel based on the power level of the first secondary channel and a desired transmission rate for the second secondary channel; and the step of determining a transmission rate further comprises the steps of:
responsive to the initial power level being greater than a power available for the second secondary channel at the power amplifier:
selecting a lower transmission rate for the second secondary channel; and
recalculating the initial power level based on the power level of the first secondary channel and the lower transmission rate, the transmission rate for the secondary channel being the lower transmission rate.

23. The method of claim 17, wherein the initial power for the second secondary channel is additionally a function of characteristics of the communication link of the primary channel, characteristics of the communication link of the first secondary channel, and characteristics of the communication link for the secondary channel.

24. The method of claim 23, wherein:

the characteristics of the communication link of the first secondary channel comprise a transmission rate of the first secondary channel;

the characteristics of the communication link for the second secondary channel comprise a desired transmission rate for the second secondary channel; and the characteristics of the communication link of the primary channel are based on at least one of:
a power level of a signal on the primary channel prior to the termination of the first signal burst;
a transmission rate on the primary channel prior to the termination of the first signal burst;
a space diversity on the primary channel prior to the termination of the first signal burst;
a power level of a signal on the primary channel shortly prior to the establishment for the second secondary channel;
a transmission rate on the primary channel shortly prior to the establishment for the second secondary channel; and
a space diversity on the primary channel shortly prior to the establishment for the second secondary channel.

25. A method for use in a system having at least one communication link including a primary channel over which a primary channel communication is transmitted, the method comprising the steps of:

establishing a first secondary channel on the at least one communication link;

transmitting a first signal burst over the secondary channel;

terminating the first secondary channel;

determining whether a predetermined time interval from termination of the first secondary channel has elapsed; and prior to a termination of the primary channel and if the predetermined time interval has not elapsed, transmitting a second signal burst over a second secondary channel, the second signal burst having an initial power level that is a function of a power level of the first signal burst.

26. The method of claim 25, wherein the transmitting step is performed responsive to the second secondary channel being established within the predetermined time interval.

27. The method of claim 26, wherein the communication link is between a transmitter and a receiver, the transmitter comprising a power amplifier, and the method further comprises, if the predetermined time interval has elapsed, performing the steps of:

obtaining the initial power level for the second signal burst based on the power level of a primary channel communication and a desired transmission rate for the second secondary channel; and responsive to the initial power level being greater than a predetermined fraction of a power available at the power amplifier:
selecting a lower transmission rate for the second secondary channel; and
recalculating the initial power level based on the power level on the primary channel communication and the lower transmission rate.

28. The method of claim 25, wherein:

the second secondary channel and the first secondary channel are established during a handoff, the handoff having at least two legs each being between a terminal and one of at least two sets of communication equipment, each of the legs including at least one of the at least one communication link; and the transmitting step is performed responsive to the second secondary channel being established on the identical legs of the handoff as the first secondary channel.

29. The method of claim 28, wherein the communication link is between a transmitter and a receiver, the transmitter comprising a power amplifier, and the method further comprises, responsive to the second secondary channel being established on different legs of the handoff than the first secondary channel, performing the steps of:

obtaining the initial power level for the second signal burst based on a power level on the primary channel communication and a desired transmission rate for the second secondary channel; and responsive to the initial power level being greater than a predetermined fraction of a power available at the power amplifier:
selecting a lower transmission rate for the second secondary channel; and
recalculating the initial power level based on the power level on the primary channel communication and the lower transmission rate.

30. The method of claim 25, wherein the communication link is between a transmitter and a receiver, the transmitter comprising an power amplifier, and the transmitting step comprises the steps of:

obtaining the initial power level for the second secondary channel based on the power level of the first secondary channel and a desired transmission rate for the second secondary channel;

responsive to the initial power level being greater than a power available for the second secondary channel at the power amplifier:
selecting a lower transmission rate for the second secondary channel; and
recalculating the initial power level based on the power level of the first secondary channel and the lower transmission rate.

31. The method of claim 25, wherein the initial power for the second secondary channel is additionally a function of characteristics of the communication link of the primary channel, characteristics of the communication link of the first secondary channel, and characteristics of the communication link for the second secondary channel.

32. The method of claim 31, wherein:

the characteristics of the communication link of the first secondary channel comprise a transmission rate of the first secondary channel;

the characteristics of the communication link for the second secondary channel comprise a desired transmission rate for the second secondary channel; and the characteristics of the communication link of the primary channel are based on at least one of:
a power level of a signal on the primary channel prior to the termination of the first signal burst;
a transmission rate on the primary channel prior to the termination of the first signal burst;
a space diversity on the primary channel prior to the termination of the first signal burst;
a power level of a signal on the primary channel shortly prior to the establishment for the second secondary channel;
a transmission rate on the primary channel shortly prior to the establishment for the second secondary channel; and
a space diversity on the primary channel shortly prior to the establishment for the second secondary channel.

33. A method for use in a wireless communication system having at least one communication link including a primary channel over which a primary channel communication is transmitted, and wherein a previous secondary channel communication was transmitted on a previous secondary channel on the at least one communication channel, the method comprising the step of:

prior to a termination of the transmission of the primary communication, obtaining an initial power level for a subsequent secondary channel communication, to be transmitted over a subsequent secondary channel on the communication link, the initial power level being a function of a power level of the previous secondary channel communication, wherein the obtaining step is performed responsive to the subsequent secondary channel being established within a predetermined time interval after a termination of the previous secondary channel, and wherein the communication link is between a transmitter and a receiver, the transmitter comprising a power amplifier;

responsive to the subsequent secondary channel being established more than the predetermined time interval after the termination of the previous secondary channel, performing the steps of:
obtaining the initial power level for the subsequent secondary channel communication based on a power level on the primary channel communication and a desired transmission rate for the subsequent secondary channel; and
responsive to the initial power level being greater than a predetermined fraction of a power available at the power amplifier:
selecting a lower transmission rate for the subsequent secondary channel; and
recalculating the initial power level based on the power level on the primary channel communication and the lower transmission rate.

34. A method for use in a wireless communication system having at least one communication link including a primary channel over which a primary channel communication is transmitted, and wherein a previous secondary channel communication was transmitted on a previous secondary channel on the at least one communication channel, the method comprising the step of:

prior to a termination of the transmission of the primary channel communication, obtaining an initial power level for a subsequent secondary channel communication, to be transmitted over a subsequent secondary channel on the at least one communication link, as a function of a power level of the previous secondary channel communication, wherein the obtaining step is performed responsive to the subsequent secondary channel being established within a predetermined time interval after a termination of the previous secondary channel, and wherein the communication link is between a transmitter and a receiver, the transmitter comprising a power amplifier; and responsive to the subsequent secondary channel being established more than a predetermined time interval after the termination of the previous secondary channel, performing the steps of:

obtaining the initial power level for the subsequent secondary channel communication based on a power level on the primary channel communication and a desired transmission rate for the subsequent secondary channel; and responsive to the initial power level being greater than a predetermined fraction of a power available at the power amplifier:

selecting a lower transmission rate for the subsequent secondary channel; and recalculating the initial power level based on the power level on the primary channel communication and the lower transmission rate.

35. A method for use in a wireless communication system having at least one communication link including a primary channel over which a primary channel communication is transmitted, the method comprising the steps of:

establishing a first secondary channel on the at least one communication link;

transmitting a first signal burst over the secondary channel;

terminating the first secondary channel;

prior to a termination of the transmission of the primary channel communication, obtaining an initial power level of a second signal burst to be transmitted over a second secondary channel as a function of a power level of the first signal burst, wherein the obtaining step is performed responsive to the second secondary channel being established within a predetermined time interval after the termination of the first secondary channel and wherein the communication link is between a transmitter and a receiver, the transmitter comprising a power amplifier;

determining a transmission rate for the second secondary channel as function of the initial power level;

responsive to the second secondary channel being established more than the predetermined time interval after the termination of the first secondary channel, performing the steps of:

obtaining the initial power level for the second signal burst based on the power level of a primary channel communication and a desired transmission rate for the second secondary channel; and responsive to the initial power level being greater than a predetermined fraction of a power available at the power amplifier:

selecting a lower transmission rate for the second secondary channel; and recalculating the initial power level based on the power level on the primary channel communication and the lower transmission rate.

36. A method for use in a system having at least one communication link including a primary channel over which a primary channel communication is transmitted, the method comprising the steps of:

establishing a first secondary channel on the at least one communication link;

transmitting a first signal burst over the secondary channel;

terminating the first secondary channel;

prior to a termination of the primary channel, transmitting a second signal burst over a second secondary channel, the second signal burst having an initial power level that is a function of a power level of the first signal burst, wherein the transmitting step is performed responsive to the second secondary channel being established within a predetermined time interval after the termination of the first secondary channel, wherein the communication link is between a transmitter and a receiver, the transmitter comprising a power amplifier;

responsive to the second secondary channel being established more than the predetermined time interval after the termination of the first secondary channel, performing the steps of:

obtaining the initial power level for the second signal burst based on the power level of a primary channel communication and a desired transmission rate for the second secondary channel; and responsive to the initial power level being greater than a predetermined fraction of a power available at the power amplifier:

selecting a lower transmission rate for the second secondary channel; and recalculating the initial power level based on the power level on the primary channel communication and the lower transmission rate.

* * * * *